United States Patent [19]
Newman, Jr.

[11] 3,962,092
[45] June 8, 1976

[54] SCREEN CHANGER

[75] Inventor: Ritchey O. Newman, Jr., Midland, Mich.

[73] Assignee: The Dow Chemical Company, Midland, Mich.

[22] Filed: Jan. 10, 1975

[21] Appl. No.: 540,289

[52] U.S. Cl. .............................. 210/236; 210/329; 210/DIG. 15
[51] Int. Cl.² ........................................ B01D 29/02
[58] Field of Search ........... 210/232, 236, 238, 350, 210/447, 460, 463, 329

[56] References Cited
UNITED STATES PATENTS

| | | | |
|---|---|---|---|
| 565,972 | 8/1896 | Lowlex | 210/447 X |
| 3,441,138 | 4/1969 | Rosaen et al. | 210/238 X |
| 3,645,401 | 2/1972 | Roberts | 210/232 |
| 3,743,101 | 7/1973 | Schmidt | 210/447 |
| 3,788,484 | 1/1974 | Godin | 210/447 |
| 3,797,665 | 3/1974 | Paquette | 210/447 |
| 3,876,545 | 4/1975 | Norwood | 210/447 X |

*Primary Examiner*—Granger Theodore A.
*Attorney, Agent, or Firm*—Robert B. Ingraham

[57] ABSTRACT

A simplified screen changer is provided which is particularly suitable for the extrusion of synthetic resinous thermoplastics. Screens are supported in a recessed movable plate. The screen on the upstream side is sealed against leakage by means of an extrusion pressure actuated sealing ring. The apparatus is of simple and rugged construction.

5 Claims, 3 Drawing Figures

SCREEN CHANGER

The removal of foreign matter from heat-plastified synthetic resinous materials and other extrudable materials has presented substantial problems for many years. The removal of foreign matter such as non-heat plastified polymer and organic, inorganic and other solids from a stream of a viscous material has been accomplished by incorporating within the stream a filter element frequently referred to as a screen-pack. Generally such filter elements consist of one or more foraminous plates which support one or more relatively thin foraminous sheets having smaller openings than the foraminous plate. Many of these screen-packs comprise a foraminous generally discoidal insert which is positioned within a conduit which is intended to pass the viscous fluid to be filtered. When sufficient foreign matter has accumulated on the screen-pack to increase the resistance to flow of the fluid therethrough to an undesirable degree, flow through the conduit is stopped, the filter element or screen-pack removed, cleaned and/or replaced. The inconvenience of stopping the stream in many operations was sufficient to inspire development of a number of devices which would permit changing the screen-pack while the flow was either maintained or interrupted for only a very short period. Two general varieties of screen-pack changers exist, one is the so-called continuous screen-pack changer wherein a filter element is continuously or continually moved across a suitable perforate support plane to provide a filtering element which will maintain at least a tolerable level of contamination in the stream. Another variety of screen-pack changer is the reciprocating screen-pack wherein a plate containing at least two suitable filtering elements is reciprocally positioned within the stream in such a manner that one or the other of the elements is interposed within the flowing stream and the remaining element is accessible for cleaning and/or changing. Some of such stream changers are generally similar to the reciprocate variety hereinbefore described and operate by employing rotary motion. Oftentimes in order to slide a plate or body containing filtering elements, it is necessary to relieve at least some of the pressure of the flowing stream and oftentimes loosen a flanged connection or other connections which press against the plate carrying the filter elements, thus requiring more time and effort than the mere sliding of a plate carrying a filter element.

It would be desirable if there were available an improved screen changer of simplified design.

It would also be desirable if there were available an improved screen changer particularly suited for plastics extrusion which permitted the changing of a screen-pack by the motion of a plate without the necessity of loosening bolts or other clamping means.

It would also be desirable if there were available an improved screen changer of simple and reliable construction.

These benefits and other advantages in accordance with the present invention are achieved in a screen changing apparatus, the apparatus comprising a conduit, the conduit having an upstream end and a downstream end, and a passage therebetween, a plate-like element slidably disposed within the conduit and extending transversely to the passage, first and second recesses defined in the plate-like element, the plate like element being in sliding engagement with the conduit toward the downstream end and when forced toward the downstream end by the force of fluid flowing therethrough, the plate-like element being in sealing engagement therewith, in the region of each of the recesses the plate-like element defining a plurality of passageways providing communication between the upstream and the downstream end of the conduit, means to slidably retain the plate-like element within the conduit and permit selective positioning of the recesses within the conduit, a sealing means disposed within the conduit between the plate-like element and the upstream end of the conduit, the sealing means being resiliently outwardly tensioned toward the conduit and forced toward the plate-like element by hydraulic pressure applied to the upstream end of the conduit.

Further features and advantages of the present invention will become more apparent from the following specification taken in connection with the drawing wherein:

FIG. 1 schematically depicts a stream filtering apparatus in accordance with the present invention in operative combination with a source of liquid to be filtered.

Figure 1:
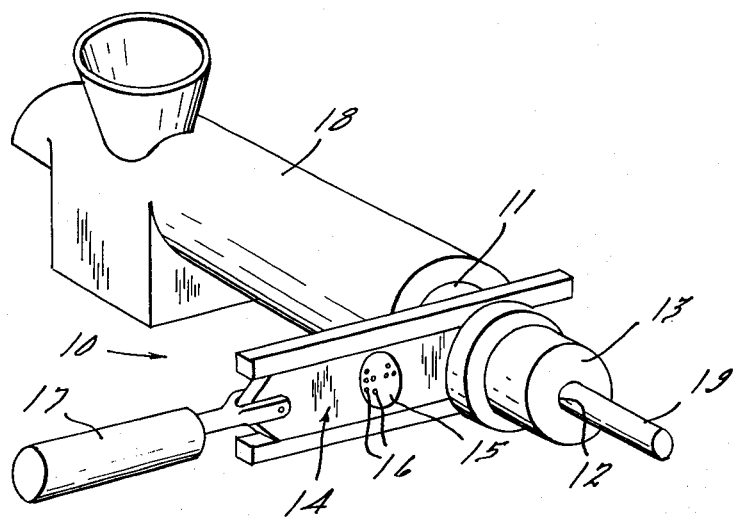

In FIG. 1 there is schematically depicted a filter changing apparatus in accordance with the present invention generally designated by the reference numeral 10. The apparatus 10 comprises in cooperation a conduit member 11 having a passageway therein. The conduit 11 has a discharge orifice or die opening 12 defined by a terminal end 13 of the conduit 11. A filter holding plate-like element 14 is disposed partially within the conduit 11 and positioned generally normal to the direction of flow therein. The plate-like element 14 as defined therein has a first circular recess 15, the recess 15 having disposed therein a plurality of openings 16 providing communication between opposed sides of the plate-like element 14. A circular recess similar to the recess 15 is disposed within the conduit 11 and is not shown. The plate-like element 14 is in operative combination with a positioning means 17 such as a hydraulic cylinder which is adapted to selectively position the recess 15 (not shown) within the conduit 11 and remote from the conduit 11. The conduit 11 has an upstream side which is in operative combination with a source 18 of liquid under pressure. An extrude or formed material 19 is depicted emerging from the orifice 12.

In operation of the apparatus such as is depicted in FIG. 1, the plate-like element 14 is disposed in such a manner that one of the foraminous recesses is interposed in the flow passageway of the conduit 11. The recesses contain suitable filter medium not shown. When the filter medium has accumulated sufficient foreign matter to warrant cleaning, the positioning means or linear actuator 17 forces the plate-like element 14 in a direction away from the linear actuator to interpose the exposed recess 15 into the passage of the conduit 11, thus carrying with it appropriate filtering medium which is disposed on the upstream side of the plate-like element 14. Thus, either of the two foraminous openings can be selectively interposed in the stream and the filter medium may be changed or replaced when the appropriate recess, such as the recess 15, is external to the conduit 11.

Figure 2:
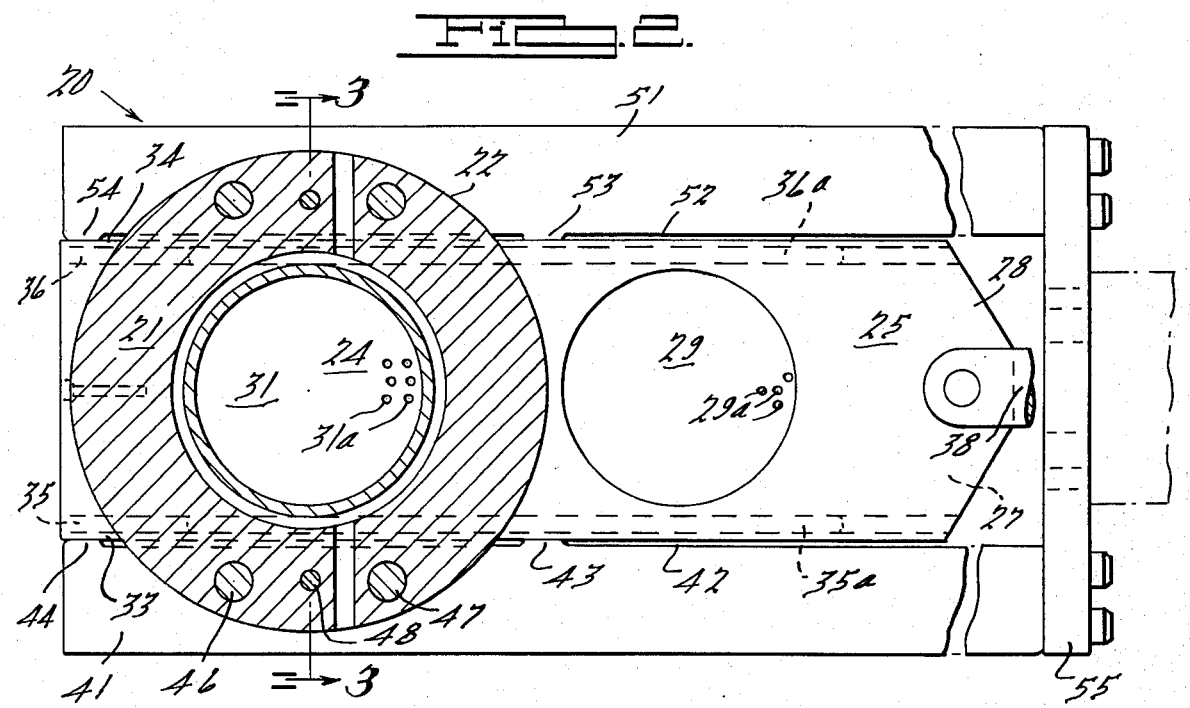
FIG. 2 is a sectional view of a screen-pack changer in accordance with the invention viewed generally from the direction of the axis of flow.

In FIG. 2 there is shown a sectional view of an apparatus in accordance with the present invention generally designated by the reference numeral 20. The apparatus 20 comprises in cooperative combination a conduit 21 having integral therewith a flange 22. The conduit 21 defines a generally centrally disposed passageway 24. Disposed partially within the passageway is a generally plate-like filter holding element or slide 25 having a first or downstream major surface 27 and second or upstream major surface 28. Within the surface 28 of the plate-like element 25 is defined a first recess 29 and a second recess 31. Within the recess 29 is defined a plurality of passageways 29a which provide communication between the surfaces 27 and 28. A similar plurality of openings 31a are defined within the recess 31. The slide 25 has a first edge portion 33 and a second edge portion 34 generally oppositely disposed and parallel. The slide 25 has a cross-sectional configuration which is rectangular at least in the regions of the recesses 29 and 31 and the portion lying between these recesses. The slide 25 defines a first longitudinally extending passageway 35 extending generally the entire length thereof and a second similar passage 36 generally oppositely disposed. The passages 35 and 36 are disposed adjacent edges 33 and 34 respectively. Beneficially the passageways 35 and 36 each contain a cartridge heater designated as 35a and 36a respectively. At one end of the slide 25 generally adjacent the recess 29 is affixed a linear actuator arm 38 generally equivalent to the arm of the linear actuator 17 in FIG. 1. Adjacent the edge 33 of the slide 25 is a first slide guide member 41. The member 41 is of generally rectangular cross-sectional configuration and has a slide engaging edge 42 disposed immediately adjacent the edge 33 of the slide 25. The edge 42 defines a first bearing boss 43 and a second bearing boss 44 both slidably engaging the edge 33 of the slide 25. The slide guide member 41 is retained to the flange 22 by means of bolts 46 and 47 and is located on the flange by means of a dowel pin 48. A second slide guide member 51 is oppositely disposed to the slide guide member 41 and is immediately adjacent the second edge 36 of the slide 25. The slide guide member 41 has a slide engaging edge 52 which defines first slide engaging boss 53 and a second slide engaging boss 54. The slide guide member 51 is affixed to the flange 22 in a similar manner as slide guide member 41. A slide guide spacing member 55 is rigidly affixed to slide guide members 41 and 51 remote from the conudit 21 and maintains affixed spacing therebetween. The linear acutator rod 38 passes therethrough.

Figure 3:
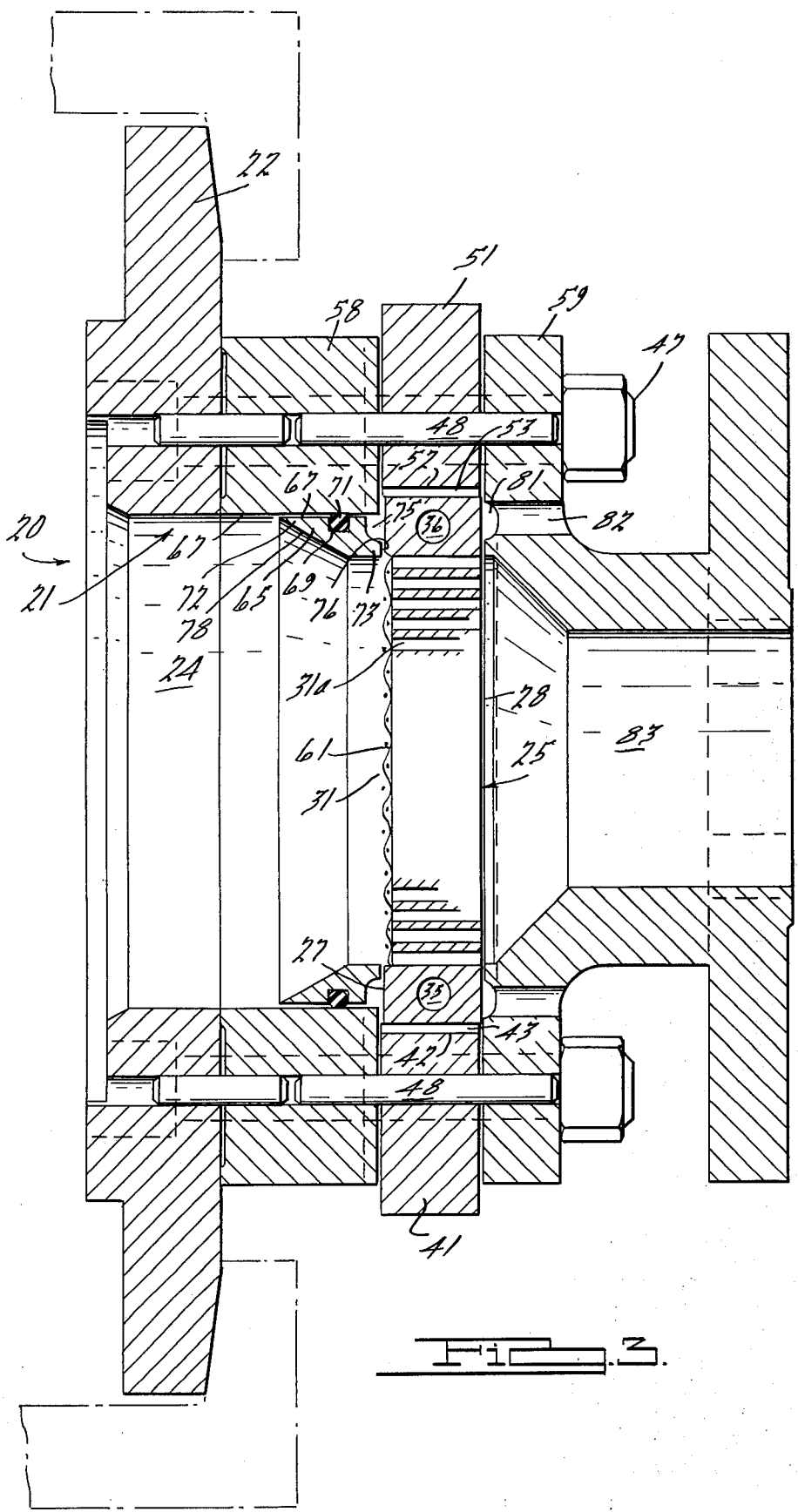
FIG. 3 is a sectional view of the appartus of FIG. 2 taken along the line 3—3 thereof.

In FIG. 3 there is shown a sectional view of the assembly of FIG. 2 taken along the line of 3-3 thereof. FIG. 2, in turn, is a sectional view, of the apparatus of FIG. 3 taken along the line of 2—2 thereof. In FIG. 3 there is depicted an apparatus 20 comprising a conduit 21 defining therein a passageway 24. The conduit 21 comprises a flange 22 which forms the upstream end of the conduit 21, a spacing ring 58 and a spool piece 59. The ring 58 and spool piece 59 have disposed therebetween the slide guide members 41 and 51. The slide 25 is shown disposed between the slide guide members 41 and 51 and the recess 31 is depicted with the openings 31a therein. Disposed within the recess 31 is a foraminous filter medium 61 such as a net or screen. A sealing ring 65 is disposed within the passageway 24 adjacent the ring 58. The sealing ring 65 has a generally cylindrical outer surface 67 which faces the adjacent inner surface of the ring 58. A generally outwardly facing recess 69 is defined by the ring 65. The recess 69 is formed in the surface 67. Disposed within the recess 69 is a O-ring 71 which bears against generally adjacent surfaces of the groove 69 and the ring 58. The ring 65 has an upstream end 72 and a downstream end 73. A generally outwardly facing annular recess 75 is defined by the ring 65 at the second end 73. The second end 73 defines a sealing surface 76 which is in engagement with the immediately adjacent portion of the slide 25. The internal diameter of the ring 65 closely approximates the diameter of the recesses 31 and 29. The ring 65 defines a generally frustoconical surface 78. The frustoconical surface 78 is disposed generally adjacent the first end 72 and extends from the first or upstream end 72 toward the downstream end 73 and is convergent toward the downstream end. The spool piece 59 defines an annular groove 81 generally adjacent the slide 25 in the region of the recess 31 of the downstream side 28 thereof. The annular groove 81 communicates with a plurality of generally axially extending leakage relief passages 82 which provide the discharge of any material leaking into the region between the spool piece 59 and the surface 28 of the slide 25.

In operation of the apparatus as depicted in FIG. 2 a viscous fluid under pressure such as a synthetic resinous thermoplastic extrudable composition is passed into the passageway 24 of the conduit 21. The material is forced through the foraminous filter medium such as wire screen 61 and passes through the openings 31a and is discharged from the passageway 83 of the spool piece 59. The pressure exerted by the material under pressure on the sealing ring 65 forces the surface 67 towards the adjacent surface of the ring 58 tending to expand the diameter of the ring 65 causing the O-ring 71 to more tightly engage both the ring 65 and the adjacent surface of the surface ring 58. The pressure of the liquid flowing through the passageway 24 causes the surface 76 of the second end 73 of the sealing ring 65 to bear tightly against the slide 25. Leakage which may bypass the sealing ring 65 and the bottom of the slide 25 enters the annular groove 81 of the spool piece 59 and is discharged via the passage 82. The slide 25 at least in the region which is suited to pass into and out of the conduit 21 has a rectangular cross-sectional configuration permitting relatively easy movement of the slide while pressure is being applied by the liquid passing through the filter medium 61. Thus, the principal resistance to movement of the slide is that portion of the surface 28 which bears against the spool piece 59 and the friction created between the surface 76 bearing on the surface 27 of the slide 25.

It is desirable that the slide be of hardened ground steel or equivalent material in order that during operation, galling and scarring does not readily occur.

It is desirable in many instances particularly when extruding the thermoplastic containing abrasives that the face 76 of the ring 65 be of hardened ground tool steel.

As is apparent from the goregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A screen changing apparatus, particularly suited and adapted for use in the extrusion of heat-plastified synthetic resinous extrudable material, the apparatus comprising a conduit, the conduit having an upstream end and a downstream end, and a passage therebetween, a plate-like element slidably disposed within the conduit and extending transversely to the passage, first and second recesses defined in the plate-like element, the plate-like element being in sliding engagement with the conduit toward the dowstream end, and when forced toward the downstream end by the force of fluid flowing therethrough, the plate-like element being in sealing engagement therewith, in the region of each of the recesses the plate-like element defining a plurality of passageways providing communication between the upstream and the downstream end of the conduit, means to slidably retain the plate-like element within the conduit and permit selective positioning of the recesses within the conduit, a sealing means disposed within the conduit between the plate-like element and the upstream end of the conduit, the sealing means comprising an annular ring, the annular ring having an internal generally frustoconical surface outwardly divergent toward the upstream end of the conduit, the ring having a generally cylindrical outer surface, the cylindrical outer surface of the sealing ring defining an outwardly facing groove, an O-ring disposed within the groove and the O-ring being in contact with the conduit.

2. The apparatus of claim 1 wherein the recesses are of generally circular configuration and contain a foraminous element is disposed within the recesses.

3. The apparatus of claim 1 wherein the platelike element is of generally rectangular configuration.

4. The apparatus of claim 1 including elongate slide guide means.

5. The apparatus of claim 4 wherein the slide guide means define slide engaging bosses.

* * * * *